(12) United States Patent
Shinnaka

(10) Patent No.: US 6,339,308 B2
(45) Date of Patent: Jan. 15, 2002

(54) VECTOR CONTROL METHOD FOR SYNCHRONOUS RELUCTANCE MOTOR

(75) Inventor: Shinji Shinnaka, Kanagawa (JP)

(73) Assignee: Okuma Corporation, Nagoya (JP)

( * ) Notice: Subject to any disclaimer, the term of this patent is extended or adjusted under 35 U.S.C. 154(b) by 0 days.

(21) Appl. No.: 09/799,636

(22) Filed: Mar. 7, 2001

(30) Foreign Application Priority Data

Mar. 17, 2000 (JP) ............................................ 12-121768

(51) Int. Cl.$^7$ .............................................. H02P 21/00
(52) U.S. Cl. ...................... 318/701; 318/254; 318/138; 318/439
(58) Field of Search ................. 318/701, 254, 318/138, 439

(56) References Cited

U.S. PATENT DOCUMENTS

| | | | | |
|---|---|---|---|---|
| 3,599,069 A | * | 8/1971 | Welch .......................... | 318/696 |
| 4,884,016 A | * | 11/1989 | Aiello .......................... | 318/685 |
| 5,998,952 A | * | 12/1999 | McLaughlin et al. ........ | 318/432 |
| 6,163,127 A | * | 12/2000 | Patel et al. .................. | 318/700 |
| 6,163,128 A | * | 12/2000 | Hiti et al. .................... | 318/722 |

* cited by examiner

*Primary Examiner*—Robert E. Nappi
*Assistant Examiner*—Rita Leykin
(74) *Attorney, Agent, or Firm*—Oliff & Berridge, PLC

(57) ABSTRACT

In a driving control method for a synchronous reluctance motor, a novel vector control method is employed which does not need the salient pole position angle detector. More particularly, the present invention provides a vector control method which can accurately and efficiently estimate cosine and sine signals, being rotation signals for the vector rotators.

A flux vector estimator 12a uses voltage and current information of a stator to estimate a stator flux vector by dividing it into an in-phase flux vector having the same direction as a current vector and a mirror-phase flux vector determined as a difference between the stator flux vector and the in-phase flux vector. A cosine and sine generator 12b uses the estimated in-phase and mirror-phase flux vectors to generate the cosine and sine values of an intermediate angle of the angles of such flux vectors and outputs a rotation signal of the vector rotators. Thus, vector control is established.

5 Claims, 13 Drawing Sheets

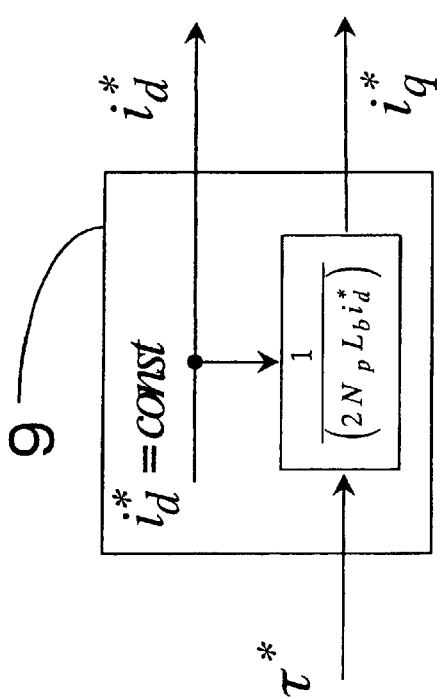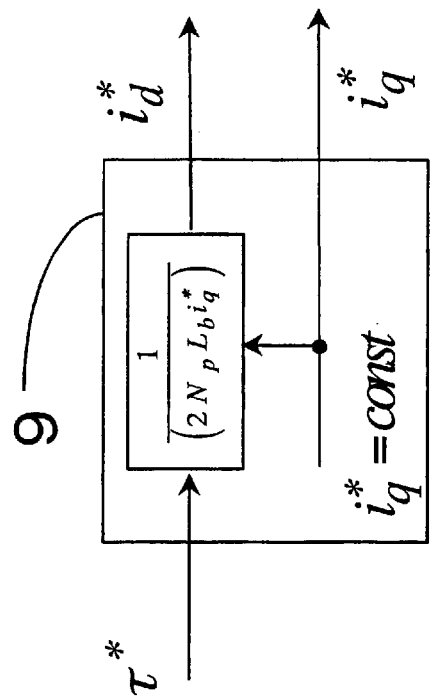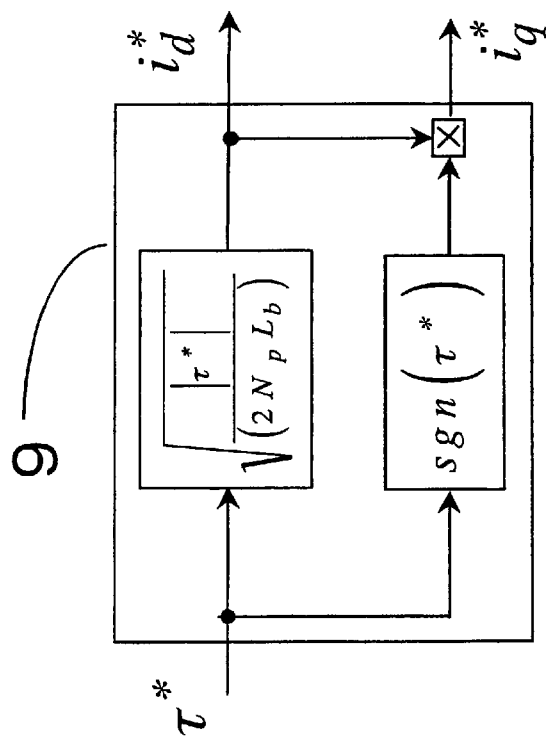
Fig. 9(a)
Fig. 9(b)
Fig. 9(c)

| $d_1(\kappa)$ | $\geq 0$ | $\geq 0$ | $< 0$ | $\geq 0$ |
|---|---|---|---|---|
| $d_2(\kappa)$ | $\geq 0$ | $< 0$ | $< 0$ | $< 0$ |
| SELECTED RESULT | EQUATION (25) | EQUATION (26) | EQUATION (27) | EQUATION (28) |

Fig. 12

VECTOR CONTROL METHOD FOR SYNCHRONOUS RELUCTANCE MOTOR

BACKGROUND OF THE INVENTION

1. Field of the Invention

The present invention relates to a vector control method for a synchronous reluctance motor. More particularly, the invention relates to a vector control method using an estimator, instead of a salient pole position angle detector mounted on a rotor, in order to secure cosine and sine information of a rotor's salient pole position angle necessary for a vector rotators for the vector control.

2. Description of the Related Art

To obtain superior drive control performance of a synchronous reluctance motor, the vector control method is conventionally employed as a well-known control method for controlling a stator current, which is essential for superior performance. The vector control method has a current control process which divides and controls the stator current contributing to the generation of a torque into a d-axis component and a q-axis component of rotational d-q coordinates composed of mutually orthogonal d and q axes which mutually cross at right angles.

Generally, d-q coordinates synchronized with the position of the main salient pole of the rotor with zero spatial phase difference are employed as rotational d-q coordinates for the vector control system. In other words, the use of synchronous d-q coordinates whose d-axis is oriented to direction of the main salient pole of the rotor and whose q-axis is orthogonal to the d-axis is very popular. Generally, the position angle of the main salient pole direction must be known in order to maintain the rotational d-q coordinates in a synchronized state free from the spatial phase difference with the main salient pole direction. Conventionally, in order to accurately ascertain the position angle, a salient position angle detector represented by an encoder mounted on the rotor.

FIG. 13 is a block diagram schematically showing a typical example of the vector control method using a salient pole position angle detector employed in a device which is in turn mounted on a standard synchronous reluctance motor which can disregard iron losses. In FIG. 13, 1 is a synchronous reluctance motor, 2 is a salient pole position angle detector, 3 is a power inverter, 4 is a current detector, 5a, 5b are a 3-2 phase converter and a 2-3 phase converter, 6a, 6b are vector rotators, 7 is a cosine and sine signal generator, 8 is a current controller, 9 is a command converter, 10 is a speed controller, and 11 is a speed detector. Components 4 to 9 in FIG. 13 configure a vector controller. For clarity and simplicity, a single solid bold line in FIG. 13 indicates a 2×1 vector signal deeply related to the present invention. Block diagrams in the following are illustrated in the same manner.

In a conventional device such as in FIG. 13, the salient pole position angle detector 2 detects the main salient pole direction as an angle with respect to the center of a U-phase winding, and the cosine and sine signal generator 7 outputs its cosine and sine signals to the vector rotators 6a, 6b. Together, these comprise a means for determining a spatial phase of the rotational d-q coordinates. In the synchronous reluctance motor, the rotor speed is the rotation speed of the rotor's salient pole. In other words, the rotor salient pole position angle and the rotor speed are in a relation of integration and differentiation, and it is known well by those killed in the art that speed information can be obtained from the salient pole position angle detector such as an encoder as well as the position angle information. The speed detector 11 is a one realizing such speed detecting means. The aforesaid five components 4, 5a, 5b, 6a, 6b, 7, 8 comprise a means for performing a current control process to divide the stator current into a d-axis component and a q-axis component on the rotational d-q coordinates, and to control the respective components to follow the current commands of the d-axis and the q-axis.

The 3-phase current detected by the current detector 4 is transformed by the 3-2 phase converter 5a into a 2-phase current on the stationary coordinates, which is, in turn, converted by the vector rotator 6a into 2-phase currents $i_d$, $i_q$, on the rotational d-q coordinates and sent to the current controller 8. The current controller 8 generates voltage commands $v^*_d$, $v^*_q$ on the rotational d-q coordinates and sends these to the vector rotator 6b so that the converted currents $i_d$, $i_q$ follow respective current commands $i^*_d$, $i^*_q$. The vector rotator 6b converts the 2-phase signals $v^*_d$, $v^*_q$ into 2-phase voltage command on the stationary coordinates and sends this to the 2-3 phase converter 5b. The 2-3 phase converter 5b converts the 2-phase signal into a 3-phase voltage command and outputs it as a command to the power inverter 3. The power inverter 3 produces power corresponding to the command and applies it to the synchronous reluctance motor 1 to drive it. At that time, the current command is obtained by converting the torque command by the command converter 9. In this example of the speed control system, a torque command is obtained as output of the speed controller 10, to which the speed command and the detected speed are input. It is known well by those skilled in the art that when it is aimed to control the torque generation and not to configure the speed control system, the speed controller 10 and the speed detector 11 are not necessary. In such a case, the torque command can be directly applied from outside.

In order to realize the conventional vector control method for the synchronous reluctance motor, the salient pole position angle detector for detecting the salient pole position angle of the rotor is required, as described in the aforesaid typical example. However, fitting of the salient pole position angle detector such as an encoder to the rotor leads to the certain heretofore unavoidable problems, as described below.

A first problem is the deterioration in the reliability of the motor system. Although mechanically the synchronous reluctance motor is one of the strongest types of AC motor, as can be seen from the structure of the rotor, the salient pole position angle detector such as an encoder is mechanically much weaker than the motor body. Consequently, the placement of the salient pole position angle detector decreases extremely the overall mechanical reliability of the motor system. In addition to the deterioration in the mechanical reliability, the reliability decrease of the motor system due to the fitting of the salient pole position angle detector also occurs in an electrical aspect observed as contamination of the salient pole position angle detector signal with power supply noise, and also a thermal aspect observed as a temperature increase in the salient pole position angle detector due to heat from the rotor. Thus, the attachment of the salient pole position angle detector such as an encoder to the motor rotor has extremely decreased the reliability of the motor system.

A second problem is increase in motor size. The attachment of the salient pole position angle detector to the rotor increases the volume of the motor in its axial direction by at least several percent to as much as 50% or more according to the volume of the motor itself.

A third problem is the necessity to secure a source of power for operating the salient pole position angle detector, wiring of a signal line to receive a detection signal and a space for wiring. Naturally, to operate the salient pole position angle detector and to obtain information about the main salient pole position angle of the rotor from the detector, wiring therefor is necessary. The signal line is also generally required to have the same strength as the power line for driving the motor body in order to prevent degradation of the mechanical, electrical, and thermal reliability. As a result, a signal line having substantially the same size as the power line and also a space are generally necessary for a single motor.

A fourth problem is an increase in cost. In the production of a compact motor, the cost of the salient pole position angle detector might become higher than that of the motor body. Also, the cost of wiring for the salient pole position angle detector cannot be disregarded, especially for a compact motor. Maintenance costs also inevitably increase when reliability decreases. These various costs increase according to the number of motors used. Especially, the maintenance cost has a property of increasing exponentially in proportion to the quantity of motors.

The above problems result directly or indirectly from the salient pole position angle detector and can be remedied naturally if a so-called sensorless vector control method that does not require the salient pole position angle detector is established. Various types of a sensorless vector control methods have been developed for an induction motor and a permanent magnet synchronous motor among other A.C. motors though they have a different level of perfection, and they are used for the application depending on the perfection. Development of a sensorless vector control method for the synchronous reluctance motor is expected, but has not yet been reduced to practice.

The present invention was achieved under the aforesaid circumstances. The object of the invention is to provide a novel vector control method which does not require the salient pole position angle detector such as an encoder for a synchronous reluctance motor in order to solve the aforesaid problems related to the synchronous reluctance motor drive control. More particularly, it is the object of the present invention to provide a vector control method that can accurately and efficiently estimate cosine and sine signals as rotation signals for the vector rotators.

SUMMARY OF THE INVENTION

In order to achieve the above object, the present invention provides a vector control method for a synchronous reluctance motor, which has a current control process for controlling to divide a stator current contributing to generation of a torque into a d-axis component and a q-axis component of a current vector on a rotational d-q coordinates with mutually orthogonal d and q axes for vector rotators, wherein a stator linkage flux is caught as a stator magnetic flux vector, the stator magnetic flux vector is divided into an in-phase magnetic flux vector having the same direction as the current vector and a mirror-phase magnetic flux vector determined as a difference between the stator magnetic flux vector and the in-phase magnetic flux vector, and estimates of cosine and sine of an intermediate angle of the angles formed by the in-phase magnetic flux vector and the mirror-phase magnetic flux vector are used as a rotation signal of the vector rotators.

In another aspect, the present invention provides a vector control method for a synchronous reluctance motor as above, but wherein estimates of cosine and sine of a double angle of the intermediate angle are determined from the in-phase magnetic flux vector or its estimate value and the mirror-phase magnetic flux vector or its estimate value, and estimates of cosine and sine of the intermediate angle are determined from the determined estimates of cosine and sine of the double angle.

According to still another aspect, the present invention provides a vector control method for a synchronous reluctance motor as above, wherein determining the estimates of cosine and sine of the intermediate angle from the estimates of cosine and sine of the double angle is changed depending on an expected magnitude of the estimates of cosine and sine of the intermediate angle.

According to still another aspect, the present invention is a vector control method for a synchronous reluctance motor as above, wherein the in-phase magnetic flux vector or a vector having the same direction as its estimate value and the mirror-phase magnetic flux vector or a vector having the same direction as its estimate value, both of which are normalized so as to have the same norm, are produced, and respective estimates of cosine and sine of the intermediate angle are determined in proportion to a first component and a second component of a synthesis vector obtained by vector adding up the above produced two vectors having the same norm.

According to still another aspect, the present invention is a vector control method for a synchronous reluctance motor as above, wherein the in-phase magnetic flux vector or a vector having the same direction as its estimate value and the mirror-phase magnetic flux vector or a vector having the same direction as its estimate value, both of which having the same norm are produced, and respective estimates of cosine and sine of the intermediate angle are determined in skewed proportion to a synthesis vector obtained by vector subtraction of the above produced two vectors having the same norm.

The operation of the present invention will next be described. For the clear understanding of the invention, the operation will be described by using with reference to mathematical models in which iron loss is disregarded. Where the rotor of the synchronous reluctance motor is captured on a general d-q coordinates rotating at an instantaneous angular velocity $\omega$, it can be illustrated as shown in FIG. 1. In FIG. 1, the d-q coordinates are not necessarily in synchronization with the direction of a main salient pole of the rotor. Therefore, the d-q coordinates are assumed to be general. A circuit characteristic of the synchronous reluctance motor in the above state can be expressed by the following circuit equations in (1) and (2).

$$v_1 = R_1 i_1 + [sI + \omega J]\phi_1 \tag{1}$$

$$\phi_1 = [L_a I + L_b Q(\theta)] i_1 \tag{2}$$

A characteristic of the torque generation can be expressed by the following equation (3).

$$\tau = N_p L_b i_1^T J Q(\theta) i_1 \tag{3}$$

In the equations (1) to (3), $v_1$, $i_1$ and $\phi_1$ are 2×1 vectors respectively denoting a stator voltage, a stator current and a stator linkage magnetic flux (stator magnetic flux), and $R_1$ denotes a copper-loss resistance of the stator, $N_p$ denotes the number of pole pairs, s denotes a differential operator d/dt. And, J denotes a skew symmetric matrix defined by the following equation (4).

$$J = \begin{bmatrix} 0 & -1 \\ 1 & 0 \end{bmatrix} \quad (4)$$

In the equations (2) and (3), Q(θ) denotes a mirror matrix defined by the following equation (5).

$$Q(\theta) = \begin{bmatrix} \cos 2\theta & \sin 2\theta \\ \sin 2\theta & -\cos 2\theta \end{bmatrix} \quad (5)$$

As shown in FIG. 1, θ of the mirror matrix denotes an instant position angle of the main salient pole of the rotor rotating at an electrical angular velocity $\omega_{2n}$ with respect to the d-axis of the general d-q coordinates.

To perform vector control, the rotational d-q coordinates are selected so that θ becomes zero, or, in other words, so that the rotational d-q coordinates synchronizes with the main salient pole position with zero phase-difference. On the synchronous d-q coordinates, the torque generation formula of the equation (3) can be reproduced in a simple form as indicated by the equation (6).

$$\tau = 2N_p L_b i_d i_q \quad (6)$$

Specifically, the generated torque is proportional to the respective d, q components $i_d$, $i_q$ of the stator current vector. Based on the above relation, the torque generation can be controlled through control of the d, q components of the stator current by means of appropriate current control systems.

However, for the equation (6) for the synchronous reluctance to be valid, it is necessary to construct the synchronous d-q coordinates in synchronization with the main salient pole position angle of the rotor without a phase difference. Therefore, conventionally, the salient pole position angle detector such as an encoder, is conventionally mounted on the rotor in order to detect the position angle on the stationary coordinates, and the resulting cosine and sine values were used for the vector rotators described by the 2×2 matrix of the following equation (7), which perform coordinate transformation between the stationary coordinates and the synchronous coordinates.

$$R(\theta) = \begin{bmatrix} \cos\theta & -\sin\theta \\ \sin\theta & \cos\theta \end{bmatrix} \quad (7)$$

According to the present invention, the stator magnetic flux vector indicated by the equation (2) is divided into an in-phase magnetic flux vector $\phi_a$ having the same direction as the current vector, and a mirror-phase magnetic flux vector $\phi_b$ determined as a difference between the stator flux vector and the in-phase flux vector. An intermediate angle among the angles formed by both of the flux vectors is determined as an estimate value of the main salient pole position angle θ of the rotor. In the present invention, the in-phase flux vector $\phi_a$ and the mirror-phase flux vector $\phi_b$ are determined as indicated by the following equations (8), (9).

$$\phi_a = L_a i_1 \quad (8)$$

$$\phi_b = \phi_1 - \phi_a = L_b Q(\theta) i_1 \quad (9)$$

Then, it will be described that the intermediate angle among the angles formed by both of the flux vectors can be used as an estimate value of the main salient pole position angle θ of the rotor. In order to simplify the description in the following, a unit vector that has the same angle as the main salient pole position angle is defined as $$u(\theta) = \begin{bmatrix} \cos\theta \\ \sin\theta \end{bmatrix}. \quad (10)$$

The stator current $i_1$ can be expressed in the general d-q coordinates as $$i_1 = \|i_1\| u(\theta_a) = \|i_1\| R(\theta_a - \theta) u(\theta) \quad (11)$$

where $\theta_a$ is the position angle of the current. The in-phase flux is synchronized with the stator current with zero phase-difference as shown in the equation (8) and can be evaluated as indicated by the following equation (12).

$$\phi_a = L_a \|i_1\| R(\theta_a - \theta) u(\theta) \quad (12)$$

Meanwhile, the mirror-phase flux can be reevaluated as indicated by the equation (13) in view of the equations (9) and (11).

$$\begin{aligned} \phi_b &= L_b \|i_1\| Q(\theta) R(\theta_a - \theta) u(\theta) \\ &= L_b \|i_1\| R(-(\theta_a - \theta)) Q(\theta) u(\theta) \\ &= L_b \|i_1\| R(-(\theta_a - \theta)) u(\theta) \end{aligned} \quad (13)$$

The equations (12) and (13) describe that the in-phase vector and the mirror-phase vector are mutually in a state of opposite phases with respect to the main salient pole position angle of the rotor. In other words, they indicate that the intermediate angle among the angles formed by both of the flux vectors can be handled as an estimate value of the main salient pole position angle θ of the rotor. Cosine and sine values of the estimate value of the main salient pole position angle θ naturally become estimates of cosine and sine of the main salient pole position angle θ. The estimates of cosine and sine obtained as described above are used for the vector rotators necessary for the synchronous d-q coordinates in the present invention. In order to assist understanding of the present invention, the relationships among the vectors of the stator current, the stator flux, the in-phase flux and the mirror-phase flux on the general d-q coordinates described by the equations (8) to (13) are illustrated as a vector diagram in FIG. 2.

It is then apparent from the above description that according to the present invention, there is obtained an operation that the estimates of cosine and sine of the rotor main salient pole position angle necessary for the vector rotators in order for the vector control without using the salient pole position angle detector to be mounted on the rotor.

Then, the operation of a further aspect of the present invention will be described. It was described with reference to the equations (8) to (13) that the in-phase flux vector and the mirror-phase flux vector were in a state of opposite phases from each other with respect to the main salient pole position angle of the rotor. Such a relationship can be indicated by the following equation (14) using the main salient pole position angle θ and the respective position angles $\theta_a$, $\theta_b$ of the in-phase and mirror-phase flux vectors.

$$2\theta = \theta_a + \theta_b \quad (14)$$

The signal necessary for the vector rotators for the vector control is not the position angle itself of the rotor main salient pole but its cosine and sine values. In other words, the following relation is also important for application.

$$u(2\theta) = \begin{bmatrix} \cos 2\theta \\ \sin 2\theta \end{bmatrix} = \begin{bmatrix} \cos\theta_a \cos\theta_b - \sin\theta_a \sin\theta_b \\ \sin\theta_a \cos\theta_b + \cos\theta_a \sin\theta_b \end{bmatrix} \quad (15)$$

The right side of the equation (15) can be calculated directly from the in-phase and mirror-phase fluxvectors. For example, it may be simply calculated by the following equation (16).

$$u(2\theta) = \frac{[\phi_a J \phi_a] \phi_b}{\|\phi_a\| \|\phi_b\|} \quad (16)$$

The following general trigonometric function for the double angle is well known.

$$\begin{bmatrix} \cos 2\theta \\ \sin 2\theta \end{bmatrix} = \begin{bmatrix} 2\cos^2\theta - 1 \\ 2\sin\theta\cos\theta \end{bmatrix} = \begin{bmatrix} 1 - 2\sin^2\theta \\ 2\sin\theta\cos\theta \end{bmatrix} \quad (17)$$

It can be seen from the above that, when the cosine and sine values of the double angle of the main salient pole position are known, the cosine and sine values of the main salient pole position can be determined from the relationship of the equation (17).

According to another aspect, the present invention is a vector control method as above, wherein the estimates of cosine and sine of the double angle of the intermediate angle are determined from the in-phase flux vector or its estimate value and the mirror-phase flux vector or its estimate value, and the estimates of cosine and sine of the intermediate angle are determined from the determined estimates of cosine and sine of the double angle. It is apparent from the above description with reference to the equations (16) and (17) that the present invention can provide the direct calculation of the estimates of cosine and sine necessary for the vector rotators from the in-phase and mirror-phase flux vectors themselves without calculating the position angles of the in-phase flux vector and the mirror-phase flux vector. The calculation of the position angle from the vectors requires an inverse operation of a trigonometric function that is a kind of nonlinear functions. It is known that the inverse operation might cause a great error or need a large amount of computation depending on the position angle. In this aspect of the present invention, however, such an inverse operation is not necessary, and estimates of cosine and sine of the position angle can be determined with relatively high accuracy by a relatively light calculation. In other words, according to this aspect of the present invention, the operation described earlier can be obtained with relatively high accuracy by a relatively light calculation.

The operation of yet another aspect of the present invention will be described. When the relationship in the first row of the equation (17) is used to calculate the estimates of cosine and sine of the main salient pole position angle from the estimates of cosine and sine of the double angle of the rotor main salient pole position, a square root operation is required. When the relation of the second row of the equation (17) is used, division operation is required, but no square root operation is necessary. Generally, the amount of computation required for performing division is small compared with that for solving a square root, so that it is desirable to use the second row as much as possible. However, because in division the error tends to be large when the absolute value of denominator is extremely small, from a practical point of view it is desirable to avoid such instances. It is apparent from the above description that when the cosine value has a large absolute value, for example, it is preferable to have the determining method indicated by the following equation (18).

$$\cos\theta = \pm\sqrt{\frac{1+\cos 2\theta}{2}}, \sin\theta = \frac{\sin 2\theta}{2\cos\theta} \quad (18)$$

Meanwhile, when the sine value has a large absolute value, the determining method indicated by the following equation (19) is preferable.

$$\sin\theta = \pm\sqrt{\frac{1-\cos 2\theta}{2}}, \cos\theta = \frac{\sin 2\theta}{2\sin\theta} \quad (19)$$

In a further aspect of the vector control method as described above, the method of determining the estimates of cosine and sine of the intermediate angle from the estimates of cosine and sine of the double angle is varied according to a predicted magnitude of the estimates of cosine and sine of the intermediate angle. As a result, it is apparent from the above description, referring to the equations (18) and (19), that there is obtained an operation that the estimates of cosine and sine can be determined as the rotation signal for the vector rotators in the state maintaining the highest computation accuracy, as well as in the state that the amount of computation is reduced rationally. In addition, according to this aspect of the present invention, the operation described above can be obtained with a high accuracy and a rationalized amount of calculation.

Next, the operation of yet another aspect of the present invention will be described. In this aspect of the present invention, in a vector control method described above, the in-phase flux vector or a vector having the same direction as its estimate value and the mirror-phase flux vector or a vector having the same direction as its estimate value, both of which having the same norm are produced, and respective estimates of cosine and sine of the intermediate angle are determined in proportion to a first component and a second component of a synthesis vector obtained by vector adding up the two vectors having the same norm.

FIG. 3 illustrates the above vector synthesis on a general d-q coordinates. In the drawing, the direction of the main salient pole of the rotor is indicated by a unit vector $u(\theta)$, and two vectors with the norm made the same are indicated by $K_2 i_1$ and $K_2 Q(\theta) i_1$. The synthesis vector obtained by addition of such vectors is indicated by $\varsigma$. It can be readily seen from FIG. 3 that the synthesis vector has the same direction as the main salient pole of the rotor. It is also possible to describe rigorously by using equations as given below that the synthesis vector by addition has the same direction as the unit vector indicating the main salient pole position.

$$\varsigma = K_2\left[\frac{\phi_a}{L_a} + \frac{\phi_b}{L_b}\right] = K_2[i_1 + Q(\theta)i_1] \quad (20)$$

$$= K_2 u^T(\theta)[i_1 + Q(\theta)i_1]u(\theta)$$

$$= 2K_2(i_1^T u(\theta))u(\theta)$$

The equation (20) proves that the additive synthesis vector becomes scalar multiple of the unit vector indicating the main salient pole position and that the description referring to FIG. 3 is valid.

It can be seen from the equation (20) that the cosine and sine values of the main salient pole position angle of the rotor can be estimated from the following relation.

$$u(\theta) = \frac{\varsigma}{2K_2(i_1^T u(\theta))} \quad (21)$$

$$= sgn(K_2 i_1^T u(\theta)) \frac{\varsigma}{\|\varsigma\|}; \, i_1^T u(\theta) \neq 0$$

Specifically, the estimates of cosine and sine of the intermediate angle can be determined in proportion to the first and second components of the synthesis vector by addition as described in this aspect of the present invention.

According to the present aspect, it is apparent from the above description referring to the equation (21) that there is obtained an operation that the estimates of cosine and sine of the intermediate angle and further the rotation signal necessary for the vector rotators can be determined by very simple calculation excepting an area where the absolute value of the inner product $(i_1^T u(\theta))$ of the stator current and the unit vector becomes small. As a result, according to the present aspect, the operation described can be achieved by very simple calculation. A method of avoiding the absolute value of the inner product of the stator current and the unit vector from becoming too small will be described in detail below with reference to an embodiment related to the present aspect.

The operation of a further aspect of the present invention will now be described. The present invention according to this aspect is a vector control method described above, wherein the in-phase flux vector or a vector having the same direction as its estimate value and the mirror-phase flux vector or a vector having the same direction as its estimate value, both of which having the same norm are produced, and respective estimates of cosine and sine of the intermediate angle are determined in skewed proportion to a synthesis vector obtained by vector subtraction of the above produced two vectors having the same norm.

FIG. 4 shows an appearance of the above vector synthesis on a general d-q coordinates. In the drawing, the direction of the main salient pole of the rotor is indicated by a unit vector $u(\theta)$, and two vectors having the norm made the same are indicated by $K_2 i_1$ and $K_2 Q(\theta) i_1$. The synthesis vector obtained by subtraction of such vectors is indicated by $\varsigma$. It is readily apparent from the same drawing that the direction of the synthesis vector becomes perpendicular to that of the rotor's main salient pole. It is also possible to precisely describe this as follows with reference to a mathematical equation.

$$\varsigma = K_2 \left[ \frac{\phi_a}{L_a} - \frac{\phi_b}{L_b} \right] = K_2 [i_1 - Q(\theta) i_1] \quad (22)$$

$$= K_2 u^T(\theta) J^T [i_1 - Q(\theta) i_1] J u(\theta)$$

$$= 2K_2 (i_1^T J u(\theta)) J u(\theta)$$

The equation (22) is used to ascertain that the direction of the subtraction synthesis vector is perpendicular to the unit vector indicating the main salient pole position and its size becomes scalar multiple, and also to prove the validity of the description with reference to FIG. 4.

It can be understood from the equation (22) that the cosine and sine values of the main salient pole position angle of the rotor can be estimated from the following relation.

$$u(\theta) = \frac{-J\varsigma}{2K_2(i_1^T J u(\theta))} \quad (23)$$

$$= -sgn(K_2 i_1^T J u(\theta)) \frac{J\varsigma}{\|\varsigma\|}; \, i_1^T J u(\theta) \neq 0$$

Specifically, as specified in the present invention, the estimates of cosine and sine of the intermediate angle can be determined in skewed proportion to the subtraction synthesis vector $\varsigma$. It should be noted that the skewed proportion is expressed in terms of the skew symmetric matrix J acting on the subtraction synthesis vector $\varsigma$ in (23), and that the skewed proportion, rather than a simple proportion, is required for the estimates because the synthesis vector $\varsigma$ is perpendicular with respect to the main salient pole direction.

According to this aspect of the invention, it is readily apparent from the above description referring to the equation (23) that the estimates of cosine and sine of the intermediate angle, and further the rotation signal necessary for the vector rotators can be determined by very simple calculation excepting an area where the absolute value of skewed inner product $(i_1^T J u(\theta))$ by the stator current and the unit vector becomes small. As a result, according to the present aspect, the operation described in the first aspect can be achieved through a relatively very simple calculation. A method of avoiding the absolute value of the skewed inner product by the stator current and the unit vector from becoming small will be described below in detail.

BRIEF DESCRIPTION OF THE DRAWINGS

FIG. 9 is a block diagram showing a schematic structure of a command converter of one embodiment;

FIG. 12 is an example of relations between a judgment index for selection of a decision method used by an intermediate angle's cosine and sine generator and a selected result.

DESCRIPTION OF PREFERRED EMBODIMENTS

Figure 1:
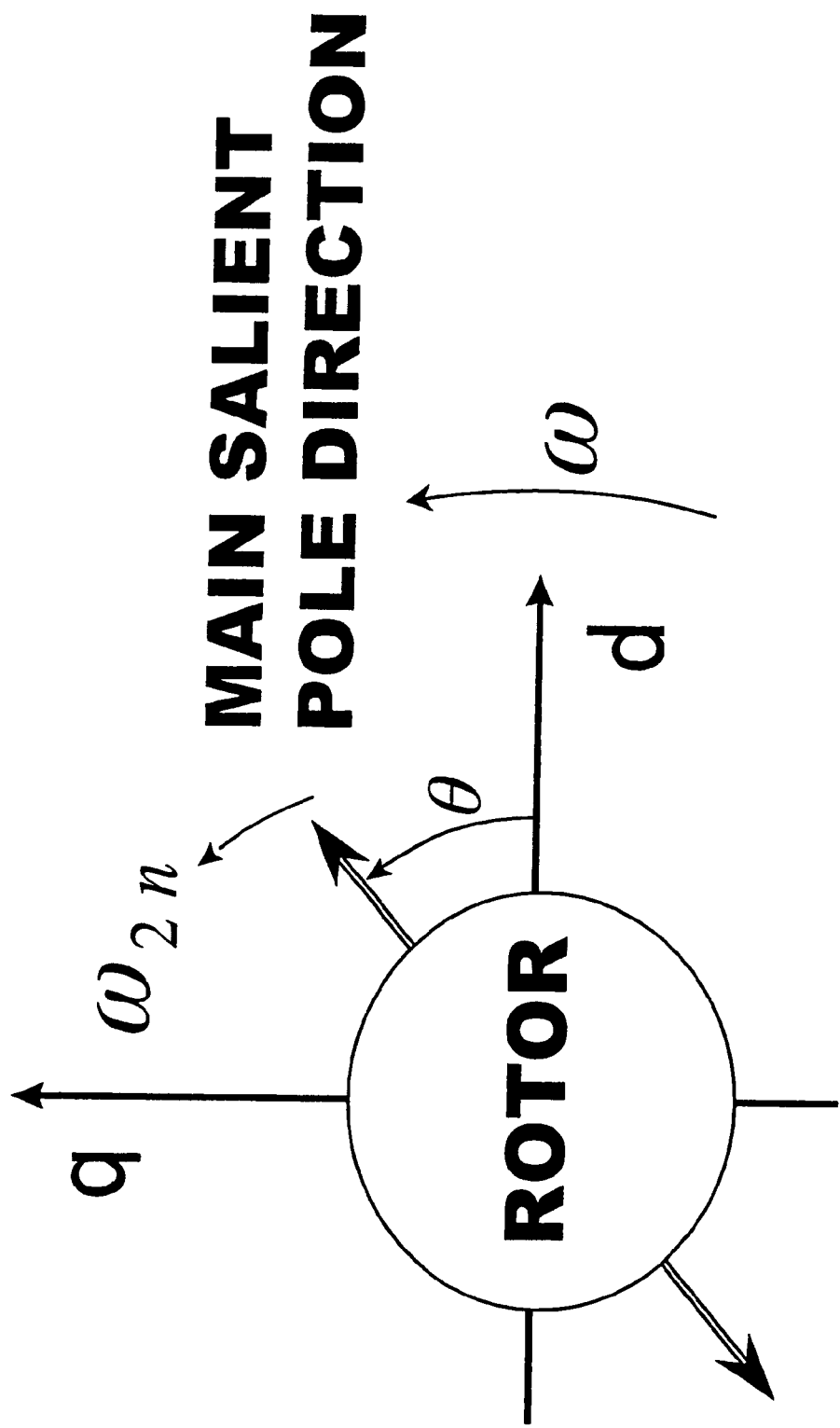
FIG. 1 is a vector diagram showing one example of relations between direction of main salient pole of rotor and d-q axes on general d-q coordinates.
Figure 2:
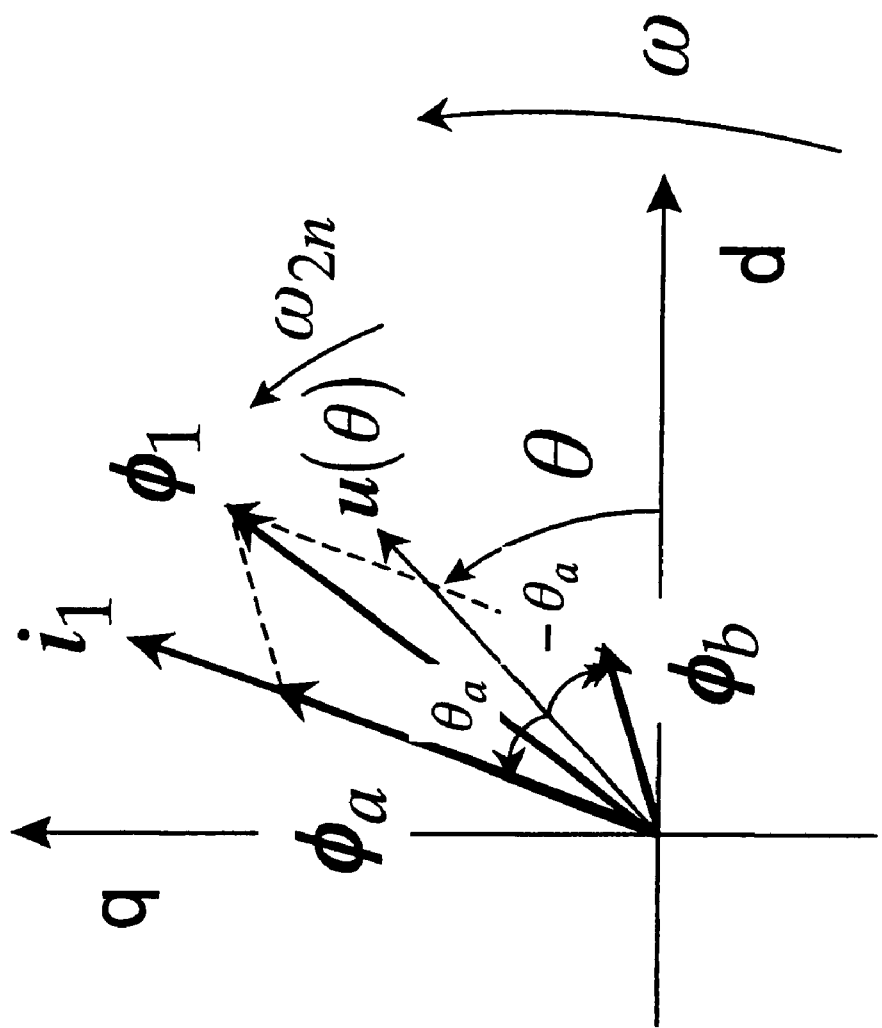
FIG. 2 is a vector diagram showing one example of relations among a stator current, a stator flux, an in-phase flux and a mirror-phase flux on the general d-q coordinates.
Figure 3:
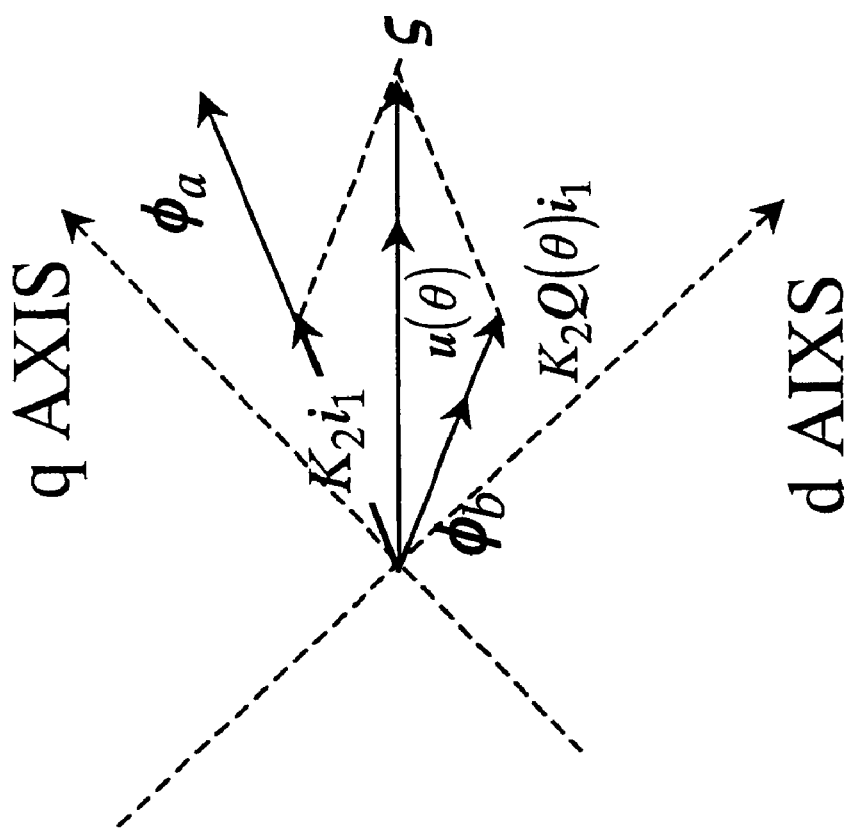
FIG. 3 is a vector diagram showing one example of relations between an addition synthesis vector and direction of a rotor main salient pole on the general d-q coordinates.
Figure 4:
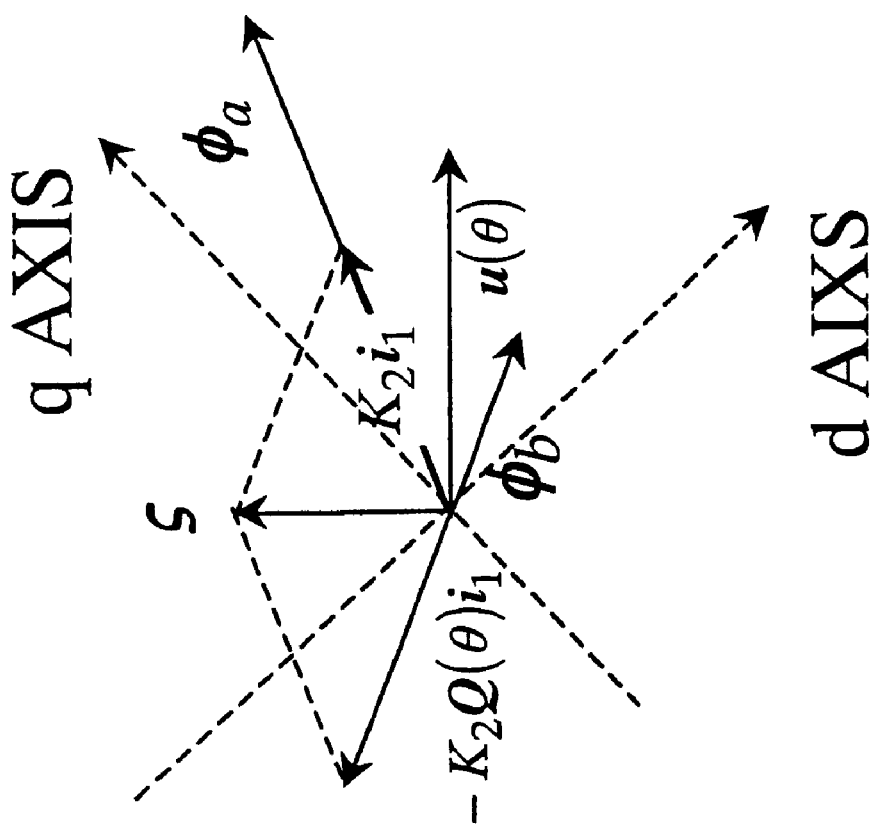
FIG. 4 is a vector diagram showing one example of relations between a subtraction synthesis vector and a rotor main salient pole direction on the general d-q coordinates.
Figure 5:
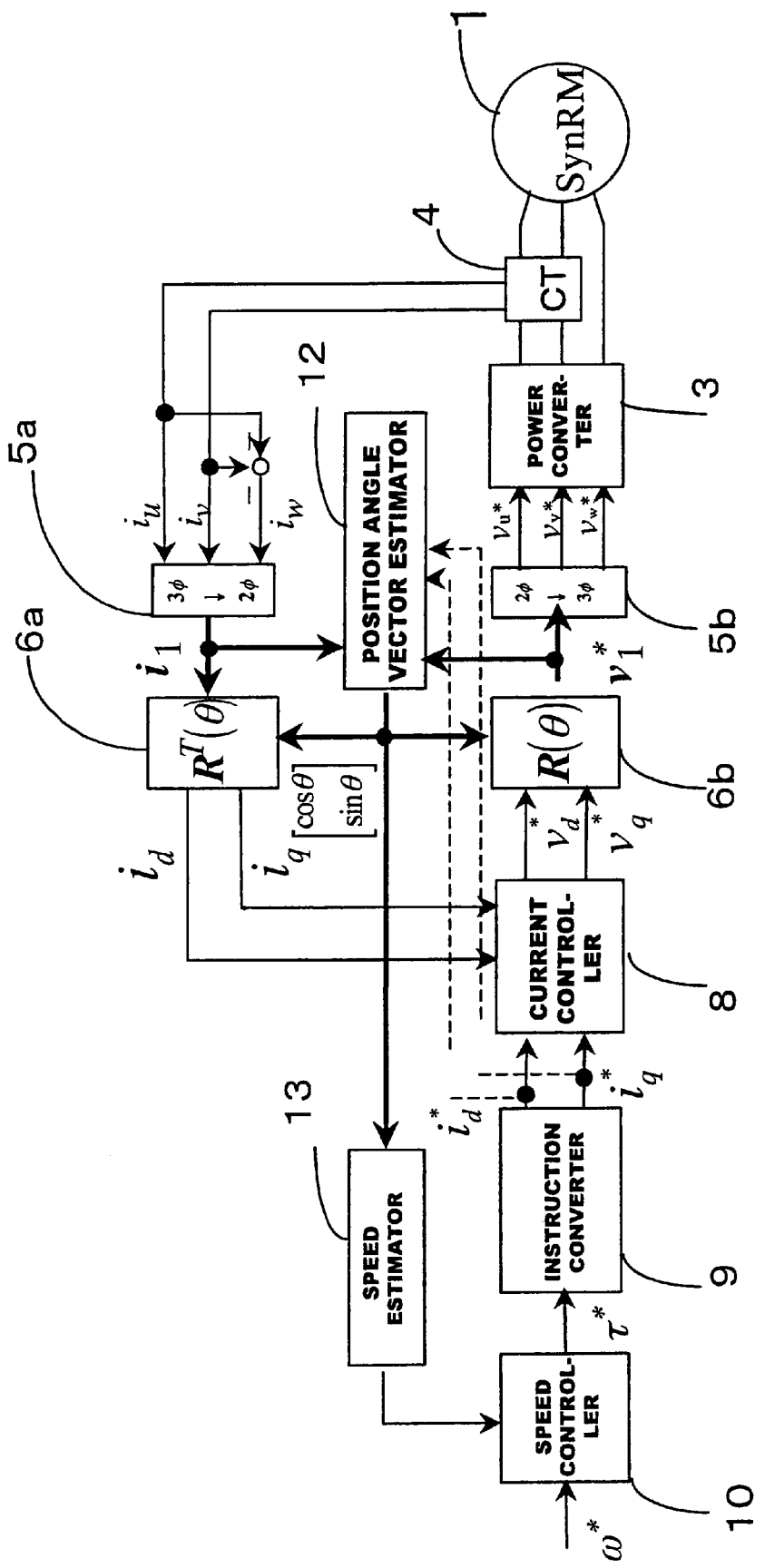
FIG. 5 is a block diagram showing a basic structure of a vector control device of one embodiment.
Figure 13:
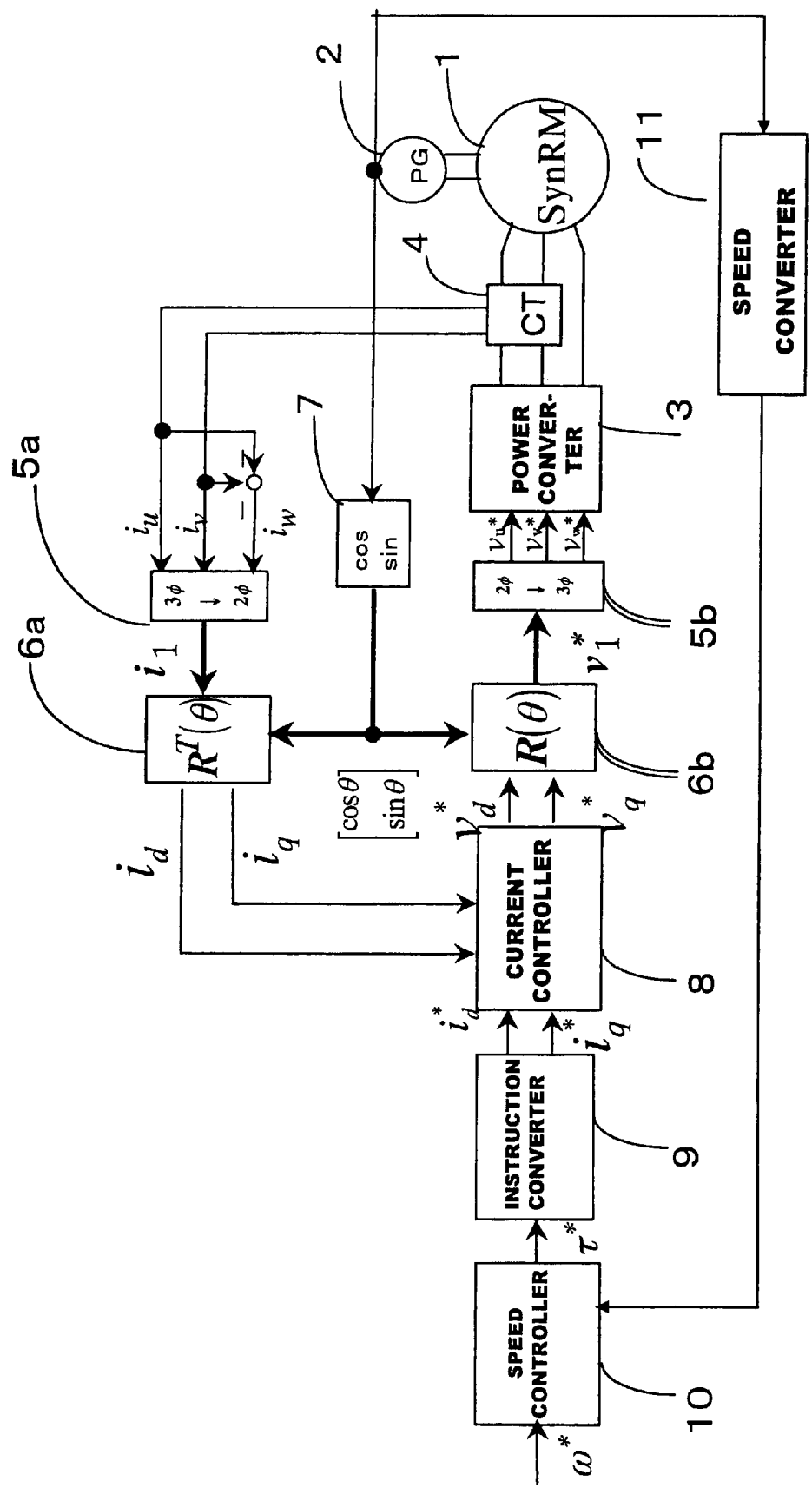
FIG. 13 is a block diagram showing a schematic structure of a conventional vector control device.

Referring to the accompanying drawings, preferred embodiments of the present invention will be described in detail using specific examples. FIG. 5 shows a basic structure of one embodiment of a vector control device and a synchronous reluctance motor to which the vector control method of the present invention is applied. This structure basically differs from the structure of a conventional control method in that a position angle estimator 12 is used instead of a salient pole position angle detector 2 and a cosine and sine signal generator 7, and in that a speed estimator 13 is used instead of a speed detector 11. Other units are basically the same as those according to the conventional control method shown in FIG. 13, though the command converter 9 is slightly modified. The principal unit of the present invention resides in the position angle vector estimator 12. The speed estimator 13 estimates a rotor speed from the estimates of cosine and sine of the position angle that is output from the position angle vector estimator 12. The speed estimator has been developed in connection with the sensorless vector control method for an induction motor and a permanent magnet type synchronous motor and well known to those skilled in the art. The command converter 9 will be described along with a configuring method suitable for the present invention in connection with the description of the embodiments of the present invention. In this embodiment, speed control is described as an example for comparison with the conventional method shown in FIG. 13, but it is to be understood that it can also be used for torque control and that the speed estimator 13 is not be necessary for torque control. The following description will focus on the position angle vector estimator 12, as it is at the conceptual core of the present invention.

It is apparent from FIG. 5 that the position angle vector estimator obtains current vector information and voltage vector information of the stator as input and outputs cosine and sine signals as a rotation signal to the vector rotators. In this embodiment, the voltage vector command on the stationary coordinates is being received as voltage information so that mounting can be made relatively easily without using a special line voltage detector, and the measured stator current vector on the stationary coordinates as current information. Naturally, when the associated cost is not a significant factor, voltage information may be obtained by using the line voltage detectors similarly to sensorless vector control methods for other AC motors. It is also possible to use as current information such estimate value as a current vector command instead of the measured current value. The position angle vector estimator also obtains a d-axis current command and a q-axis current command, which are input of the current controller, in addition to the above voltage and current information. According to the present invention, such current commands are not always necessary but may be useful in certain embodiments. Therefore, a situation of auxiliary input was specified by a dashed signal line. Output of the position angle vector estimator is an estimate value of cosine and sine of the intermediate angle of the angles formed by an in-phase flux vector and a mirror-phase flux vector as described in detail, and is used as rotation signals of two vector rotators as shown in FIG. 5.

Figure 6:
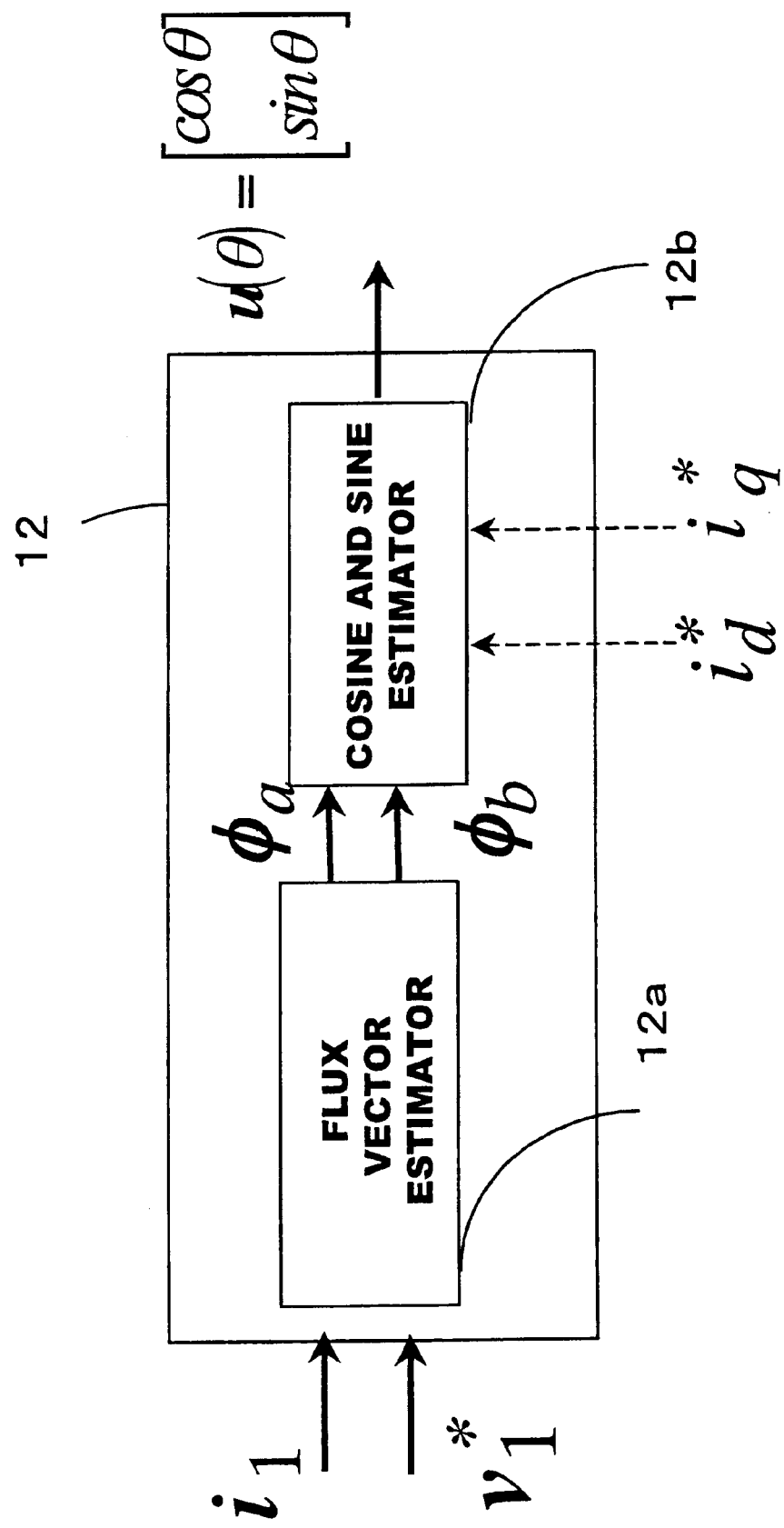
FIG. 6 is a block diagram showing a schematic structure of a position angle vector estimator of one embodiment.

FIG. 6 shows the inside structure of the position angle vector estimator 12. The position angle vector estimator 12 generally comprises two components, such as a flux vector estimator 12a and a cosine and sine generator 12b. The flux vector estimator 12a estimates and outputs the in-phase magnetic vector and mirror-phase flux vector from the current vector information and voltage vector information of the stator. The cosine and sine generator 12b obtains the estimates of the in-phase flux vector and the mirror-phase flux vector and outputs the estimates of cosine and sine of the intermediate angle of the angles formed by them. As apparent from FIG. 6 and the above description, the estimates of cosine and sine of the intermediate angle of both of the flux vectors are determined by using the estimates of both of the flux vectors. The d-axis current command and the q-axis current command may be additionally used by the cosine and sine generator, as indicated by dashed lines in the drawing.

Figure 7:
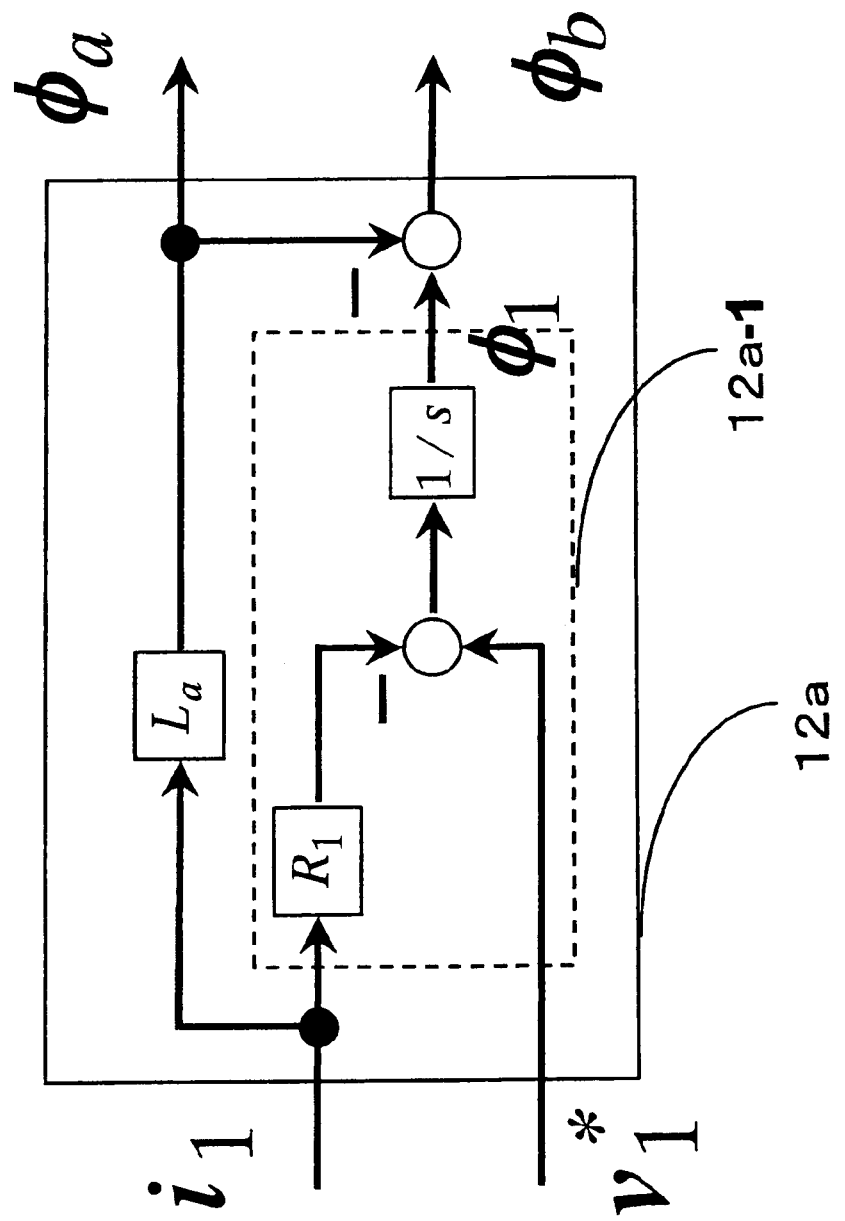
FIG. 7 is a block diagram showing a schematic structure of a flux vector estimator of one embodiment.

FIG. 7 shows a typical structure of the flux vector estimator 12a. In the drawing, 12a-1 denotes a stator flux vector estimator. This unit serves to receive the voltage information and current information of the stator, and to estimate and output the stator flux. As a method therefor, a method which is known to those skilled in the art for the sensorless vector control of an induction motor and a permanent magnet type synchronous motor can be used. In this embodiment, the stator flux is estimated by a simple method indicated by the following equation.

$$\phi_1 = 1/s [v_1 - R_1 i_1] \qquad (24)$$

In FIG. 7 and the equation (24), 1/s denotes integration processing by an integrator. As is well known to those skilled in the art, the integration processing can be accomplished by digital approximation.

The in-phase flux vector with the same direction as the current vector is fundamentally estimated according to the relation of the equation (8). Meanwhile, mirror-phase flux is fundamentally determined according to the second formula of the equation (9) as a difference between the stator flux vector and the in-phase flux vector. It is apparent from the comparison between the equation (2) and the equations (8), (9) and FIG. 7 that the estimation processing here is to divide the stator flux vector estimate value into the in-phase flux vector estimate value and the mirror-phase flux vector estimate value.

Figure 8:
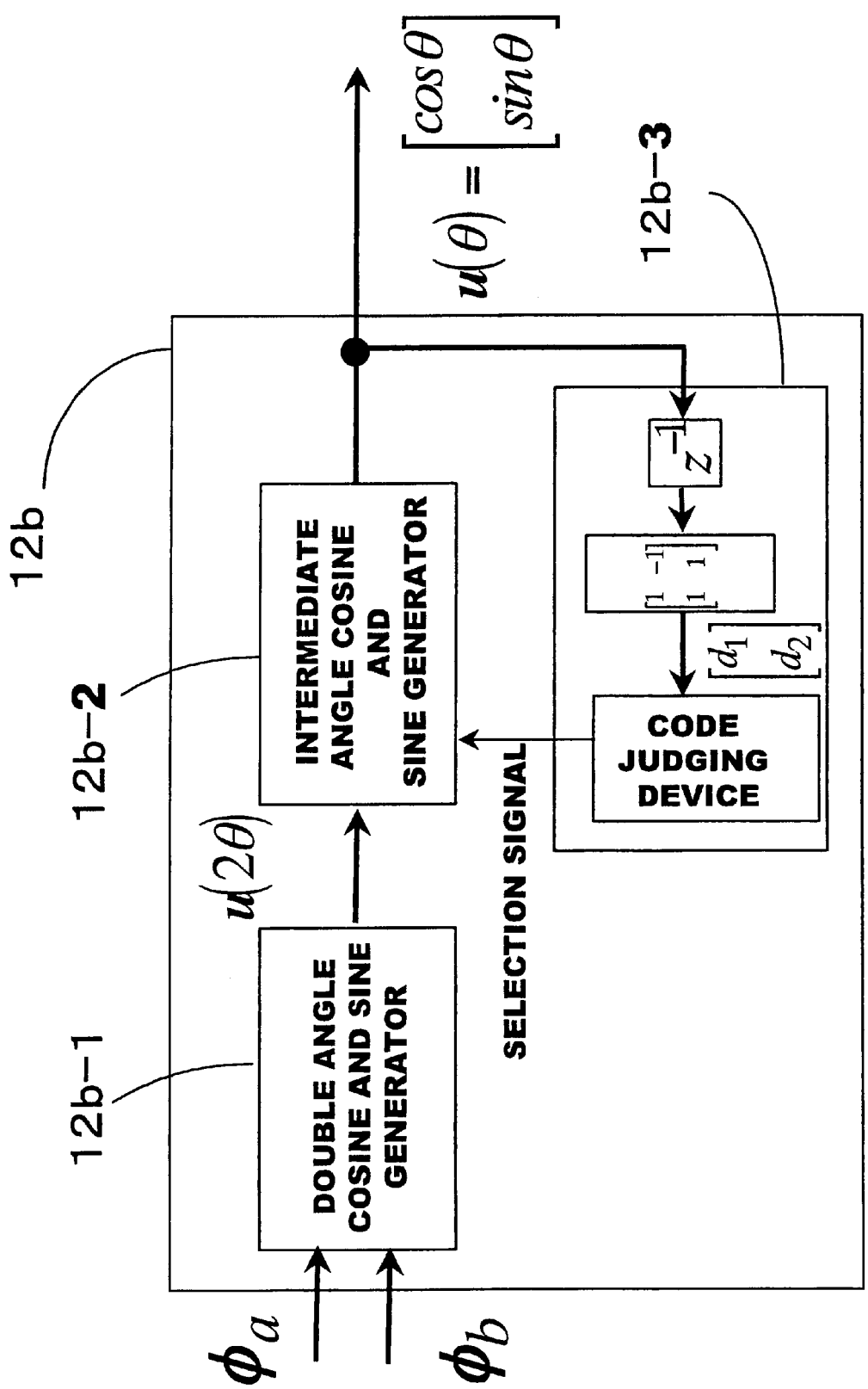
FIG. 8 is a block diagram showing a schematic structure of a cosine and sine generator of one embodiment.

FIG. 8 shows a first embodiment of the cosine and sine generator 12b. In the drawing, 12b-1 is a double angle cosine and sine generator and 12b-2 is an intermediate angle cosine and sine generator. And, 12b-3 is a judging device which generates a selection signal to be used for selection of a determination method by the intermediate angle cosine and sine generator.

The double angle cosine and sine generator receives as input the estimates of the in-phase flux vector and the mirror-phase flux vector, determines the estimates of cosine and sine of the double angle of the intermediate angle of both vectors and outputs them. This estimate value determination processing is performed according to the equation (16). The intermediate angle cosine and sine generator 12b-2 receives as input the cosine and sine estimates of the double angle output from the double angle cosine and sine generator 12b-1 and uses them to determine and output the estimates of cosine and sine of the intermediate angle.

According to the present invention, the method for deciding the estimates of cosine and sine of the intermediate angle from the estimates of cosine and sine of the double angle is changed depending on an expected magnitude of the estimates of cosine and sine of the intermediate angle. For example, the intermediate angle cosine and sine generator 12b-2 may be provided with the four types of determination methods indicated by the following equations (25) to (28) and may selects one among these according to the estimated magnitude of the estimates of cosine and sine of the intermediate angle.

$$\cos\theta = \sqrt{\frac{1+\cos 2\theta}{2}}, \sin\theta = \frac{\sin 2\theta}{2\cos\theta}; \frac{-\pi}{4} \leq \theta \leq \frac{\pi}{4} \quad (25)$$

$$\sin\theta = \sqrt{\frac{1-\cos 2\theta}{2}}, \cos\theta = \frac{\sin 2\theta}{2\sin\theta}; \frac{\pi}{4} < \theta \leq \frac{3\pi}{4} \quad (26)$$

$$\cos\theta = -\sqrt{\frac{1+\cos 2\theta}{2}}, \sin\theta = \frac{\sin 2\theta}{2\cos\theta}; \frac{3\pi}{4} < \theta < \frac{5\pi}{4} \quad (27)$$

$$\sin\theta = -\sqrt{\frac{1-\cos 2\theta}{2}}, \cos\theta = \frac{\sin 2\theta}{2\sin\theta}; \frac{5\pi}{4} \leq \theta < \frac{7\pi}{4} \quad (28)$$

In the equations (25) to (28), considering that a magnitude of the cosine and sine values of the intermediate angle directly depends on the value of the intermediate angle, the conditions for selecting the determination method are shown with an intermediate angle value at the rightmost term of each equation.

The judging device 12b-3 serves to determine an expected magnitude of the estimates of cosine and sine of the intermediate angle and to select the aforesaid determination method. In each component of the present invention, processing may be digital. As a specific embodiment, FIG. 8 shows an example of determining an expected magnitude at present by using the estimates of cosine and sine of the intermediate angle earlier by one control cycle considering the digital processing. In this example, it is assumed that the present moment is a moment k, the one control cycle earlier is moment (k−1) and the cosine and sine estimate value of the intermediate angle at the moment (k−1) is u(θ, k−1). In FIG. 8, $z^{-1}$ is a delay element for one control cycle and serves to output the input signal after delaying it by one control cycle. The operation after the above element is as follows.

First, the cosine and sine estimate value of the intermediate angle at the moment (k−1) are processed according to the relation of the equation (29) to generate a judgment index $d_1(k)$, $d_2(k)$ at the moment k.

$$\begin{bmatrix} d_1(k) \\ d_2(k) \end{bmatrix} = \begin{bmatrix} 1 & -1 \\ 1 & 1 \end{bmatrix} u(\theta, k-1) \quad (29)$$

Then, according to the above judgment index, it is judged which of the equations (25) to (28) shall be used as a judging method at the moment k. The judgment according to the index $d_1(k)$, $d_2(k)$ is performed according to the method shown in FIG. 12. The method of FIG. 12 judges only by positive and negative signs of the judgment index and its third row shows output (selected results) while its first and second rows show input (codes for the judgment index). Thus, the present invention described with reference to the embodiment is very useful and can simply and rationally select an equation to be used. In the embodiment of the cosine and sine generator of FIG. 8, the commands values of the d-axis and q-axis current are not specified because they are not used.

FIG. 9(a) is one example structure of the command converter 9 suitable for the embodiment of the cosine and sine generator shown in FIG. 8. As specified with reference to the equation (6), when the absolute values of the d-axis current and the q-axis current on the synchronous d-q coordinates are equal, a torque can be generated with a minimum copper loss. The example structure of the command converter 9 of FIG. 9(a) is an example of achieving the minimum copper loss for efficiency. According to the present invention with the cosine and sine generator 12b of FIG. 8, efficient drive control can be realized.

Figure 10:
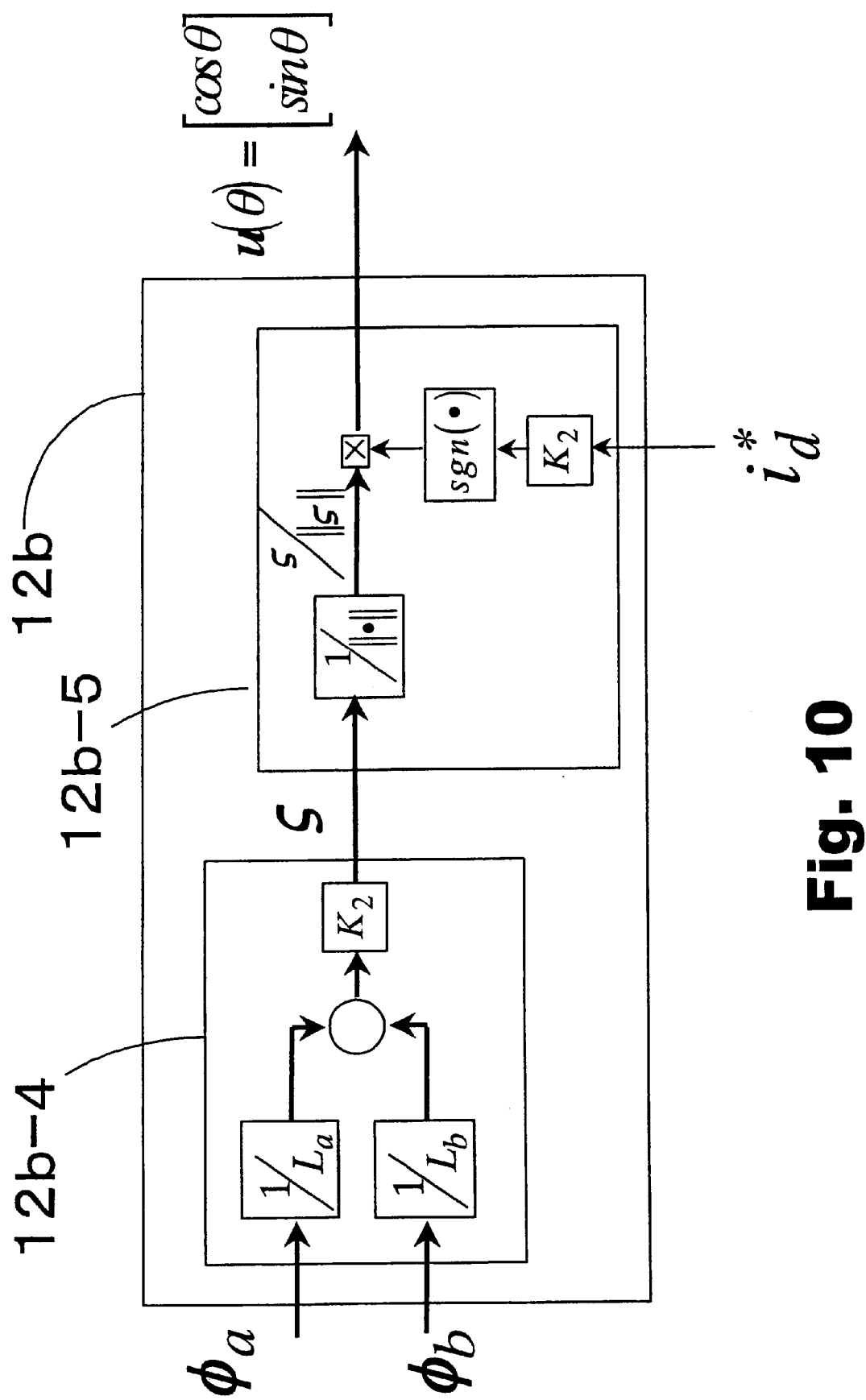
FIG. 10 is a block diagram showing a schematic structure of a cosine and sine generator of one embodiment.

FIG. 10 shows a second embodiment of the cosine and sine generator 12b. In this drawing, 12b-4 is a vector addition synthesizer. The vector addition synthesizer multiplies the estimate value of the in-phase flux vector and the estimate value of the mirror-phase flux vector by the reciprocal of their respective inductances, makes its norm the same, and then generates and outputs a synthesis vector by adding the vectors. In the vector addition synthesizer, $K_2$ is a design parameter whose design is entrusted to a designer and may be generally selected as desired but can be preferably selected to be 1, $L_a$ or $L_b$. In FIG. 10, 12b-5 is a vector normalization device for the additive synthesis vector and determines the estimates of cosine and sine of the intermediate angle in proportion to the synthesis vector. In this embodiment, the vector having the cosine and sine values of the intermediate angle as first and second components is a unit vector, so that such a unit property is used to normalize the synthesis vector to a unit vector so to determine the estimates of cosine and sine in a form proportional to the synthesis vector. In principle, this embodiment uses the operation described with reference to the second formula of the equation (21). As shown by the second formula of the equation (21), the sign factor which judges a positive or negative sign needs a value of inner product of the current vector and the unit vector. This is approximated by the d-axis current command in this embodiment. In other words, the following relation is used.

$$i_1^T u(\theta) \approx i^{d*} \quad (30)$$

Only the positive or negative sign of a signal is required to estimate the cosine and sine values, the actual magnitude of the signal is not needed. From the signal used to estimate the cosine and sine values, only the positive or negative sign is determined, and the magnitude itself is not considered. In view of the above characteristic, the d-axis current command, which is little influenced by noise, often provides a favorable response as compared with the measured value.

Of course, it is also possible to decide the estimates of cosine and sine of the intermediate angle according to the first formula of the equation (21). The inner product of the current vector and the unit vector can also be approximated by the d-axis current command or the like.

FIG. 9(b) shows one example structure of the command converter 9 suitable for the embodiment of the cosine and sine generator shown in FIG. 10. In order to cause the cosine and sine generator of FIG. 10 respond rationally, it is necessary to avoid the d-axis current becoming a very small value including zero. This can be simply accomplished by configuring the command converter 9 as shown in FIG. 9(b). In other words, the command converter 9 is configured such that the d-axis current is maintained at a predetermined constant value while the q-axis current is varied depending on a torque command. Thus, the d-axis current can be prevented from becoming a very small value including zero, and can be made to rationally respond to the cosine and sine generator of FIG. 10. Naturally, the embodiment shown in FIG. 9(b) fundamentally satisfies the relationship of torque generation of the equation (6).

Figure 11:
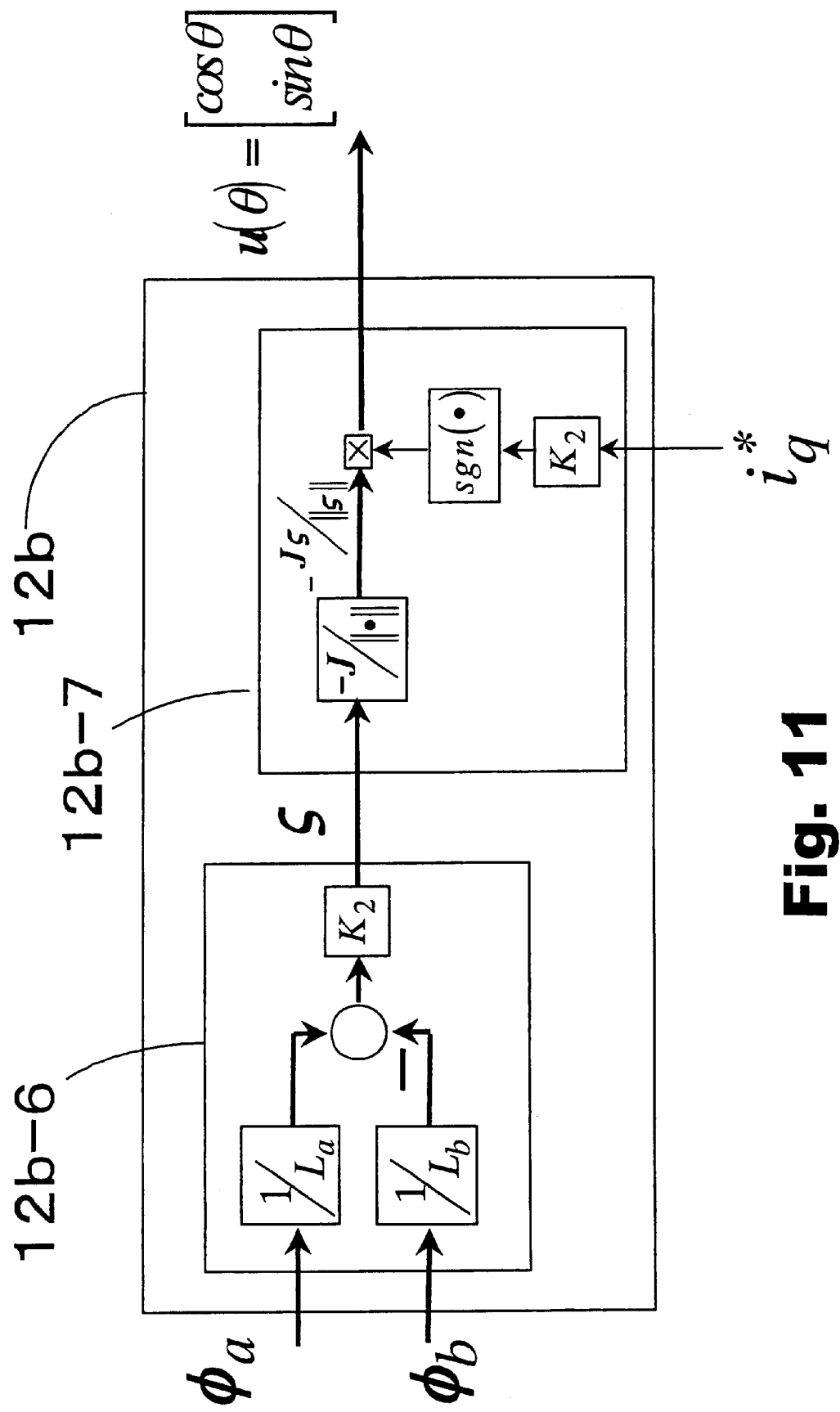
FIG. 11 is a block diagram showing a schematic structure of a cosine and sine generator of one embodiment.

FIG. 11 is a third embodiment of the cosine and sine generator 12b. In the drawing, 12b-6 denotes a vector subtraction synthesizer. The vector subtraction synthesizer multiplies the estimate value of the in-phase flux vector and the estimate value of the mirror-phase flux vector by the reciprocal of each related inductance to make the norm the same, and performs vector subtraction to generate and output a synthesis vector. In the vector subtraction synthesizer, $K_2$ is a design parameter whose design is entrusted to the designer and generally selected as desired, with 1, $L_a$, $L_b$ being preferable candidate values. In FIG. 11, 12b-7 is a vector normalization device for the subtraction synthesis vector and decides the estimates of cosine and sine of the intermediate angle in skewed proportion to the synthesis vector. In this embodiment, the vector having the estimates of cosine and sine of the intermediate angle as first and second components is a unit vector, and the estimates of cosine and sine of the intermediate angle are in skewed proportion to the synthesis vector. This embodiment utilizes the operation described with reference to the second formula of the equation (23) in principle, and skew symmetric matrix J of the vector normalization device 12b-7 that also appears in the equation (23) is defined by the equation (4). As indicated by the second formula of the equation (23), the sign factor for judging the positive or negative sign requires a value of skewed inner product of the current vector and the unit vector. This is approximated by the q-axis current command in this embodiment, and the following relation is used.

$$i_1^T J u(\theta) \approx i_q^* \tag{31}$$

Only the positive or negative sign of a signal is required to estimate the cosine and sine values, the actual magnitude of the signal is not needed. From the signal used to estimate the cosine and sine values, only the positive or negative sign is determined, and the magnitude itself is not considered. In view of the above characteristic, the q-axis current command which is hardly influenced by noises, often provides a favorable response as compared with the measured value.

Of course, it is also possible to decide the estimates of cosine and sine of the intermediate angle according to the first formula of the equation (23). The skewed inner product of the current vector and the unit vector can be approximated by the q-axis current command or the like.

FIG. 9(c) is an example structure of the command converter 9 suitable for the embodiment of the cosine and sine generator shown in FIG. 11. In order to make the cosine and sine generator of FIG. 11 respond rationally, it is necessary to prevent the q-axis current from becoming a very small value including zero. A simple method for accomplishing this is to configure the command converter 9 as shown in FIG. 9(b). The command converter 9 of FIG. 9(b) is configured so that the q-axis current is always kept at a predetermined value while the d-axis current is varied depending on a torque command value. Thus, the q-axis current can be prevented from becoming a very small value including zero, and can be made to rationally respond to the cosine and sine generator of FIG. 11. Naturally, the embodiment shown in FIG. 9(c) in principle satisfies the relation of torque generation of the equation (6).

The position angle vector estimator according to the present invention was described in detail in the above embodiments with reference to the accompanying drawings. As described at several points in this specification, the position angle vector estimator according to the present invention is preferably configured digitally in view of the remarkable progress in digital technology in these days. The digital structure includes a hardware structure and a software structure, and, as apparent to those skilled in the art, either of these can be used as a structure of the present invention.

As apparent from the above description, the present invention provides the following effects. Particularly, the invention of claim 1 divides the stator flux vector into the in-phase flux vector having the same direction as the current vector and the mirror-phase flux vector which is determined as a difference between the stator flux vector and the in-phase flux vector, and uses the estimates of cosine and sine of the intermediate angle of the angles formed of the in-phase flux vector and the mirror-phase flux vector as a rotation signal of the vector rotators. According to the present invention, there is obtained the operation that the estimates of cosine and sine of the intermediate angle can be handled as the estimates of the cosine and sine values of the rotor's main salient pole position angle, so that the rotation signal for the vector rotators can be obtained without using the salient pole position angle detector mounted on the rotor. As a result, there are provided effects that the vector rotators required for the vector control of the synchronous reluctance motor can be operated normally, and that the vector control of the synchronous reluctance motor can be performed without using the salient pole position angle detector which is conventionally mounted on the rotor. There are also provided remedy effects to various problems with the conventional art, such as a deterioration in reliability of the motor system, a dimension increase in the axial direction, a wiring problem and an increase of various costs caused by the attachment of the salient pole position angle detector to the rotor when the vector control of the synchronous reluctance motor is performed.

As described above, the present invention can also be configured such that the estimates of cosine and sine of the double angle of the intermediate angle are first determined from the in-phase flux vector or its estimate value and the mirror-phase flux vector or its estimate value, then the estimates of cosine and sine of the intermediate angle are determined from the determined estimates of cosine and sine of the double angle. Therefore, the estimates of cosine and sine required for the vector rotators can be calculated directly from the in-phase flux vector and the mirror-phase flux vector without calculating their position angles. Because an inverse computation for calculation of the position angle is unnecessary, there is also realized an effect that the estimates of cosine and sine of the position angle can be determined with relatively high accuracy and by a relatively small amount of computation. Thus, it is possible to configure the present invention such that the operation can be secured rationally. As a result, there is obtained an effect that the effects described above can be achieved with relatively high accuracy and in a relatively small amount of computation.

The present invention may also be configured such that the method of determining the estimates of cosine and sine of the intermediate angle from the estimates of cosine and sine of the double angle is decided according to an expected magnitude of the estimates of cosine and sine of the intermediate angle. In this manner, there can be obtained the operation for obtaining the estimates of cosine and sine necessary for the vector rotators such that the highest calculation accuracy is maintained while the amount of computation is reduced. As a result, the effects of the present invention can be achieved in a state such that the highest calculation accuracy is maintained while the amount of computation is reduced.

The present invention can further be configured such that the in-phase flux vector with the norm made the same or a vector having the same direction as its estimate value and the mirror-phase flux vector or a vector having the same direction as its estimate value are produced, and the respective estimates of cosine and sine of the intermediate angle are determined in proportion to first and second components of the synthesis vector obtained by addition of the two vectors having the same norm. Thus, there is obtained an operation enabling the estimates of cosine and sine of the intermediate angle to be determined by a simple computation excepting an area where the absolute value with the same component as the rotor's main salient pole direction of the stator current becomes small. Thus, the effects of the present invention can be achieved by a very simple computation.

The present invention may also be configured such that the in-phase flux vector with a norm made the same or a vector having the same direction as its estimate value and the mirror-phase flux vector or a vector having the same direction as its estimate value are generated, and the respective estimates of cosine and sine of the intermediate angle are determined in skewed proportion to a form with codes mutually inverted with respect to second and first components of a synthesis vector obtained by subtraction of the two vectors with the same norm. In this way, the estimates of cosine and sine of the intermediate angle can be determined by a very simple computation excepting an area where the absolute value of the stator current component vertical to the rotor's main salient pole direction becomes insignificant. Accordingly, the effects of the present invention can be achieved by a very simple computation.

According to certain aspects of the present invention as described above, use in the area where the same component as the rotor's main salient pole of the stator current or the vertical component becomes small is restricted as cost of the decrease in an amount of computation. The practical method for avoiding such an area in such a way that the effects of the present inventions are not lost was specifically described above.

While there have been described that what are at present considered to be preferred embodiments of the invention, it is to be understood that various modifications may be made thereto, and it is intended that the appended claims cover all such modifications as fall within the true spirit and scope of the invention.

What is claimed is:

1. A vector control method for a synchronous reluctance motor, which has a current control process for controlling to divide a stator current contributing to generation of a torque into a d-axis component and a q-axis component of a current vector on rotational d-q coordinates which consist of mutually orthogonal d and q axes mutually intersecting at right angles associated with vector rotators, wherein:

a stator linkage flux is determined as a stator flux vector, the stator flux vector is divided into an in-phase flux vector having the same direction as the current vector and a mirror-phase flux vector determined as a difference between the stator flux vector and the in-phase flux vector, and estimates of cosine and sine of an intermediate angle of angles formed by the in-phase flux vector and the mirror-phase flux vector are used as a rotation signal for vector rotators.

2. The vector control method for a synchronous reluctance motor according to claim 1, wherein the estimates of cosine and sine of a double angle of the intermediate angle are determined from the in-phase flux vector or its estimate value and the mirror-phase flux vector or its estimate value, and the estimates of cosine and sine of the intermediate angle are determined from the determined estimates of cosine and sine of the double angle.

3. The vector control method for a synchronous reluctance motor according to claim 1, wherein the method of determining the estimates of cosine and sine of the intermediate angle from the estimates of cosine and sine of the double angle is set according to an estimated magnitude of the estimates of cosine and sine of the intermediate angle.

4. The vector control method for a synchronous reluctance motor according to claim 1, wherein the in-phase flux vector with a norm made the same or a vector having the same direction as its estimate value and the mirror-phase flux vector with a norm made the same or a vector having the same direction as its estimate value are produced, and respective estimates of cosine and sine of the intermediate angle are determined in proportion to a first component and a second component of a synthesis vector obtained by addition of the two vectors having the same norm.

5. The vector control method for a synchronous reluctance motor according to claim 1, wherein the in-phase flux vector with a norm made the same or a vector having the same direction as its estimate value and the mirror-phase flux vector with a norm made the same or a vector having the same direction as its estimate value are produced, and respective estimates of cosine and sine of the intermediate angle are determined in skewed proportion to a form with codes mutually inverted with respect to a second component and a first component of a synthesis vector obtained by subtraction of the two vectors with the same norm.

* * * * *